United States Patent [19]

Nakamura

[11] Patent Number: 4,463,276

[45] Date of Patent: Jul. 31, 1984

[54] COIL UNIT OF CORELESS ARMATURE AND METHOD OF MANUFACTURING THE SAME

[75] Inventor: Yoshimitsu Nakamura, Osaka, Japan

[73] Assignee: Matsushita Electric Works, Ltd., Osaka, Japan

[21] Appl. No.: 387,870

[22] PCT Filed: Oct. 31, 1980

[86] PCT No.: PCT/JP80/00271

§ 371 Date: Jun. 10, 1982

§ 102(e) Date: Jun. 10, 1982

[87] PCT Pub. No.: WO82/01626

PCT Pub. Date: May 13, 1982

[51] Int. Cl.$^3$ .............................................. H02K 1/22
[52] U.S. Cl. ..................................... 310/266; 310/71; 310/198
[58] Field of Search ...................... 310/184, 198–208, 310/266, 71, 40 MM; 22/598

[56] References Cited

U.S. PATENT DOCUMENTS

| | | | |
|---|---|---|---|
| 3,623,220 | 11/1971 | Chase | 310/266 |
| 3,650,021 | 3/1972 | Karol | 310/266 |
| 4,103,196 | 7/1978 | Saito | 310/266 |
| 4,123,679 | 10/1978 | Miyasaka | 310/266 |
| 4,323,806 | 4/1982 | Aoki | 310/266 |

FOREIGN PATENT DOCUMENTS

| | | | |
|---|---|---|---|
| 2610686 | 9/1976 | Fed. Rep. of Germany | 310/266 |
| 2821740 | 11/1978 | Fed. Rep. of Germany | 310/266 |
| 2841838 | 4/1979 | Fed. Rep. of Germany | 310/198 |
| 36-11016 | 7/1961 | Japan | 310/266 UX |
| 51-43561 | 11/1976 | Japan | 310/68 R UX |
| 54-7506 | 1/1979 | Japan | 310/266 |
| 55-26089 | 2/1980 | Japan | 310/198 |
| 55-144754 | 11/1980 | Japan | 310/266 UX |

Primary Examiner—R. Skudy
Attorney, Agent, or Firm—Burns, Doane, Swecker & Mathis

[57] ABSTRACT

This invention relates to a coil unit of coreless armatures. Inner and outer cylindrical coils formed of parallelly arranged coil element wires of an equal length are fitted and combined with each other and overlapping parts thereof are joined sequentially to form electrically closed loops. The thickness in the radial direction of the coil unit is made uniform by means of the foregoing formation. Also, as the length per turn of the coil element wires becomes uniform, a coil unit excellent in the dynamic balance can be obtained and, further, the shape of the cross-section of the coil element wires can be made proper with the cross-sectional area made constant, so that motors of different numbers of turns can be easily designed.

2 Claims, 31 Drawing Figures

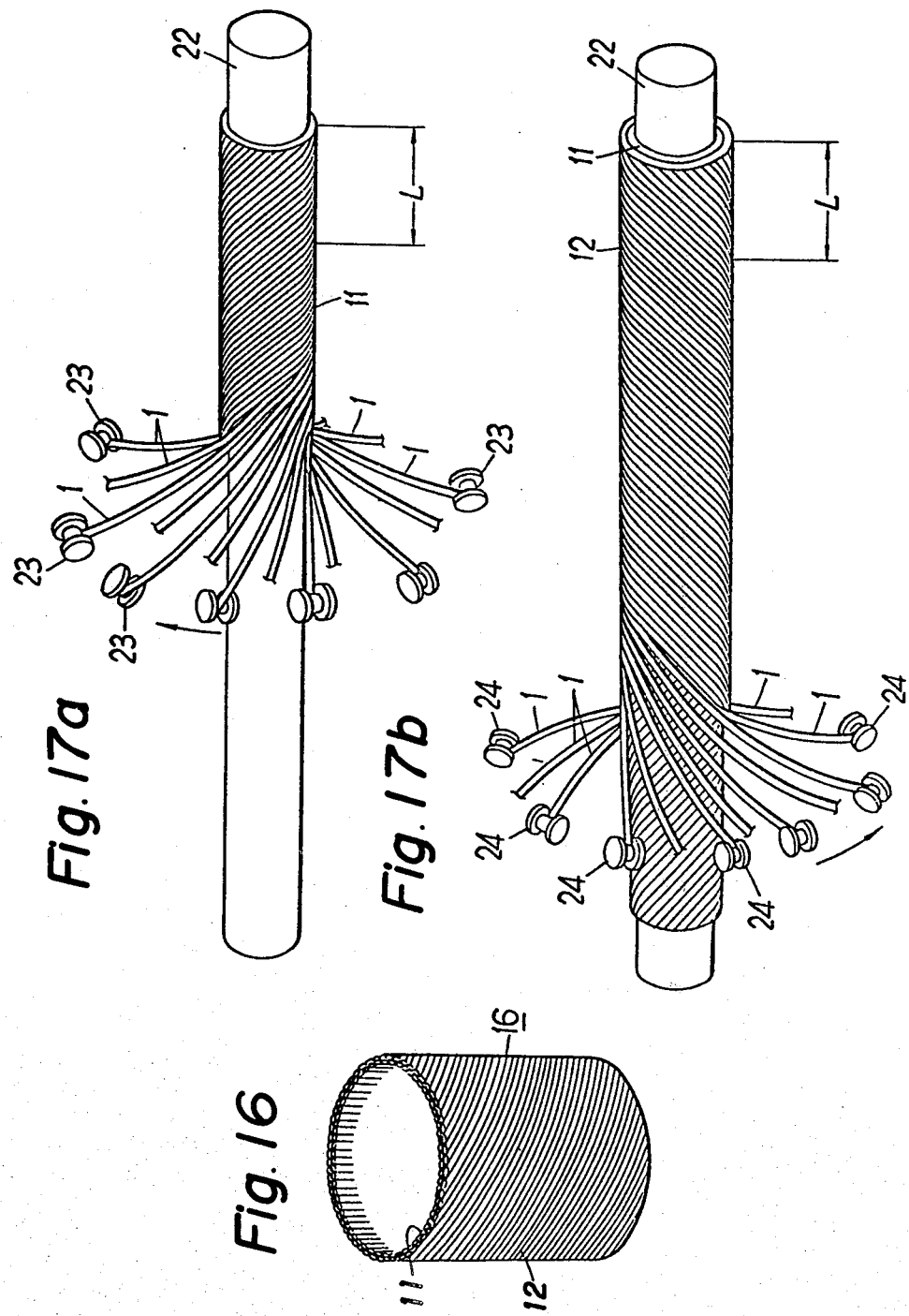

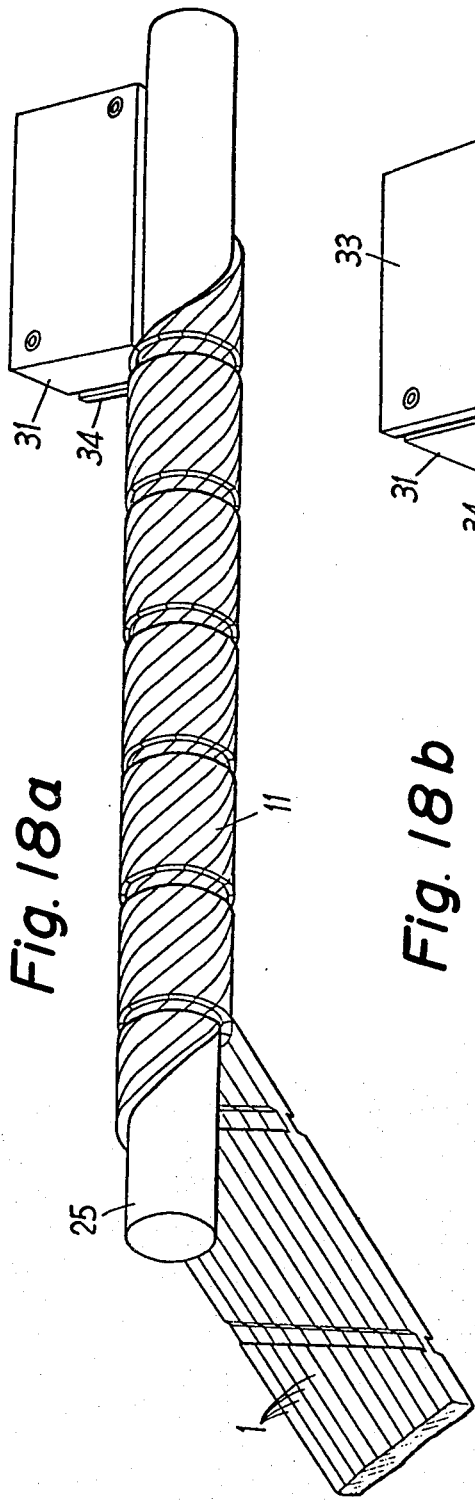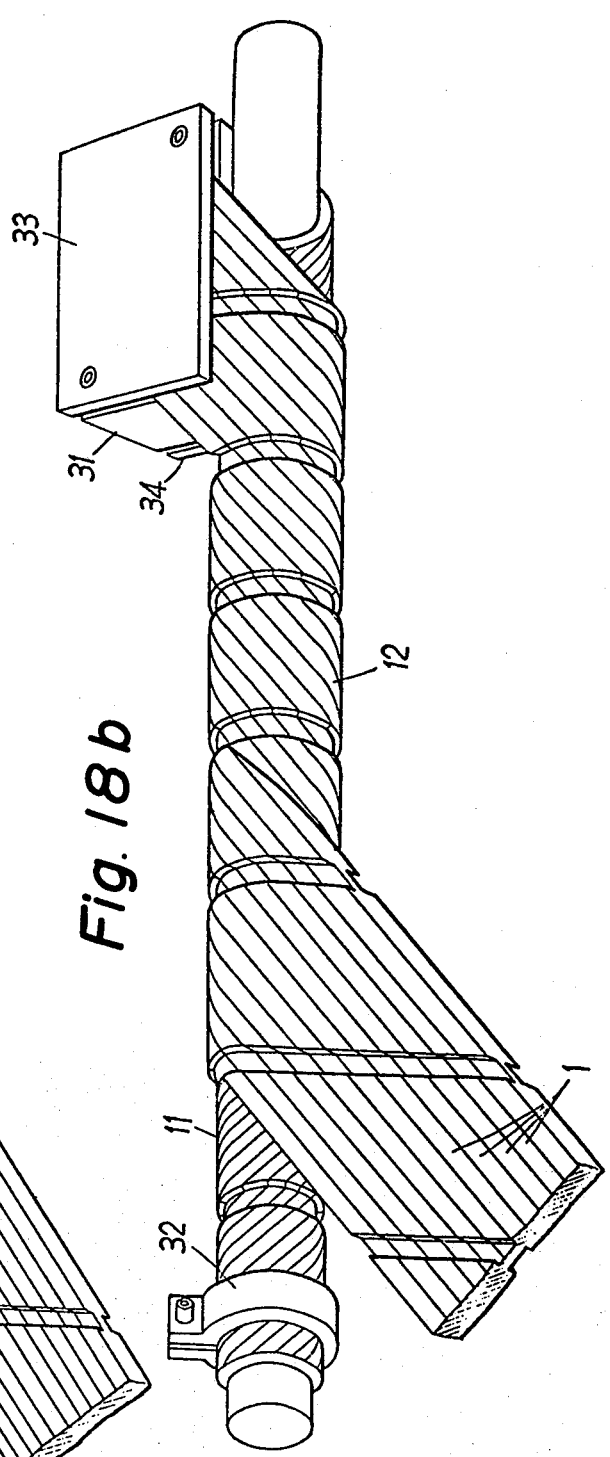

COIL UNIT OF CORELESS ARMATURE AND METHOD OF MANUFACTURING THE SAME

TECHNICAL FIELD

This invention relates to coil units of coreless armatures used in direct current miniature motors and, more particularly, to a coil unit of coreless armatures which consists of coil elements wound into a cylindrical shape at an extremely high density.

The coil unit of the kind referred to is used for example, in direct current miniature motors (FIG. 1).

That is, in the direct current miniature motor a stator is formed by rendering a yoke 41 integral by means of a synthetic resin with a cylindrical permanent magnet 42 provided withing the yoke 41 separated from the inner peripheral surface of the yoke 41, which magnet creates a magnetic field for driving the armature. A coreless armature is formed by fixing a coil unit 16' at its upper end to a commutator plate 17' which is coupled through a metal boss 46 to a shaft 18'. The shaft 18' is rotatable by means of bearings 44 interposed through the permanent magnet 42. A brush plate 51 having terminals 50 connected to brushes 49 is fixed to the open end of the yoke 41.

General ones of conventional coil unit of the coreless armatures have been formed by winding a coil element wire into a barrel-shape with a coil winding machine and subjecting it to a forming into a cylindrical shape.

BACKGROUND ART

As shown in FIG. 2 or 3, these coil units of the coreless armatures have been formed by winding a single coil element wire 1' sequentially in the directions indicated by arrows so as to be diamond-shaped or tapered and shaping it into the cylindrical shape by causing a coating of the coil element wire adhered integral without requiring an iron core. There have been such defects that, at it is necessary to wind up the coil unit with a single winding to the last, it must be made one by one and, therefore, the productivity is low. As the coil element wire is wound up as inclined, the overlapped parts increase with advances of the winding and the diameter will partly increase to cause the diameter of the coil unit to be partly varied. Thus, the coil wire length per turn is non-uniform and has a poor dynamic balance. When the coil element wire is flat, the wire cannot be freely bent as twisted so that a coil unit of coreless armatures of the flat coil element wire in section and small coil thickness cannot be obtained.

Causes of the poor dynamic balance and appearance shall be explained more in detail with reference to FIG. 4.

FG. 4 is a perspective view of an essential part of an example of the conventional coil unit of coreless armatures.

According to the winding formation shown in FIG. 2, first, as has been disclosed, the winding of the coil element wire is made in the order of a , b , c , and d in close contact as shown in FIG. 4 and is terminated in the order of 4 , 3 , 2 , and 1 after making one rotation along the circumference as overlapped on the wire previously wound. The coil element wire parts a , b , c , and d are held by turning parts 4 ', 3 ', 2 ', and 1 ' of 4 , 3 , 2 , and 1 and both groups are adhered to be integral.

The parts 4 and 4 ' of the coil element wire are held by the later wound parts 3 , 2 , and 1 ; the parts 3 and 3 ' are held by the parts 2 and 1 ; the parts 2 and 2 ' are held by the part 1 . The coil element wire parts 1 and 1 40 will no longer have any coil element wire to hold them from above when the turning part of the wire 1 and 1 ' is the last one, and this part is left in a state likely to float up (or to be easily separated). As a result of the foregoings, the coil unit obtained is poor in the dimensional precision of the inner and outer diameters and also poor in appearance.

Further, there have been such defects that, since the wire parts 1 ', 2 ', 3 ', and 4 ' are interposed between the wire parts a , b , c and d exposed below the above-overlapping wire parts 1 , 2 , 3 and 4 and a compression in the surfatial direction is required for making the thickness of the coil unit constant, they are caused to be abruptly bent in the overlapping parts as shown in FIG. 4 to become poor in the unbalanced and, at the same time, the coil element wire is subjected to a severe work or stressing.

The reason why the designing of a miniature direct current motor has been made inflexible shall be explained next with reference to FIGS. 5 to 7.

FIG. 5 is a plan view schematically showing a conventional coil unit of coreless armatures, and FIG. 6 is a view showing the conventional coil element wire.

Once the wire diameter of the coil element wire 1' is determined in this conventional cylindrical coil, the number of turns has to be limited in relation to the diameter of the coil unit 16' thus, such characteristics as the torque, number of revolutions and the like of the motor will not be able to be improved, whereby the designing of the motor is rendered inflexible. In order to improve the characteristics of the motor, the wire diameter of the coil element wire 1' has had to be varied. In the case where, for example, as in FIGS. 5 to 7, the wire diameter of the wire 1' is "d" and this wire 1' is wound by a winding method shown in FIG. 7(a) to form a coil unti 16' of a diameter D with a winding angle $\theta$ of the wire 1' with respect to an end edge of the coil unit 16', the number of turns N is represented by $N = \pi(p+d) \sin \theta / d$, the magnetic flux of the coil unit 16' is determined by the number of turns N. Therefore, the torque and number of revolutions of the motor are limited by the wire diameter d of the coil element wire 1'.

OBJECTS OF THE INVENTION

The first of the objects of the present invention is to obtain a coil unit for coreless armatures which can be manufactured without the so-called winding step to make it possible to achieve a sequential mass-production, and which exhibits ability in the possible designs of coil pattern, uniform in the wire length of the coil element wire per turn and excellent in the dynamic balance and commutating wave form.

The second of the objects of the present invention is to provide a coil unit for miniature motors or the like wherein the number of turns can be increased while maintaining the cross-sectional area of the coil element wire to be constant by using a flat coil element wire and various characteristics of the motor can be improved.

The third of the objects of the present invention is to obtain a method of manufacturing the foregoing, coil unit of coreless armatures.

The present invention shall be explained in the followings with reference to the drawings for its easy understanding.

BRIEF DESCRIPTION OF THE DRAWING

FIG. 16 is a perspective view of a coil unit formed by the steps of FIGS. 15(a) to 15(c);

FIGS. 17(a) and 17(b) are perspective views showing a practical method of forming the coil unit;

FIGS. 18(a) and 18(b) are perspective views showing another practical method of forming the coil unit; and FIGS. 19 and 20 are views showing still another embodiment of a coil unit of the present invention, wherein FIG. 19 is a perspective view and FIG. 20 is a schematic plan view thereof.

DETAILED DESCRIPTION OF PREFERRED EMBODIMENTS OF THE INVENTION

The basis of the present invention shall be first explained with reference to FIGS. 8 to 16.

FIGS. 8(a) to (e) are explanatory views of steps for manufacturing the coil unit of an embodiment of the present invention.

As the first step, eight coil element wires 1 are arranged in the axial direction on a cylindrical surface so as to form a pipe shape at a flat pitch and not to overlap on each other. A straight cylindrical coil 2 (shown in FIG. 8(a)) wherein, respective one ends of the wires 1 are indicated as $3i$ to $10i$ and the other ends as $3i'$ to $10i'$, is twisted clockwise by 180 degrees at one surface of the ends $3i$ to $10i$ to form a spiral i.e., helical inner cylindrical coil 11 (shown in FIG. 8(b)).

Figure 8A:
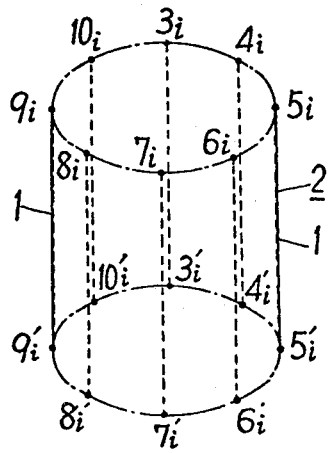
FIGS. 8(a) to 8(e) are explanatory views of manufacturing steps of the coil unit in one embodiment of the present invention.
Figure 8B:
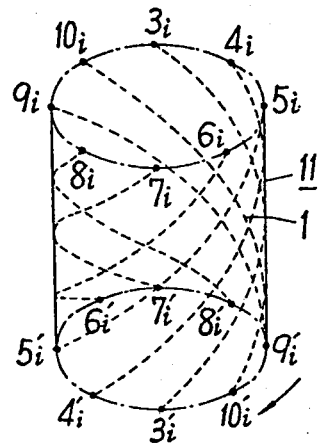
Figure 8C:
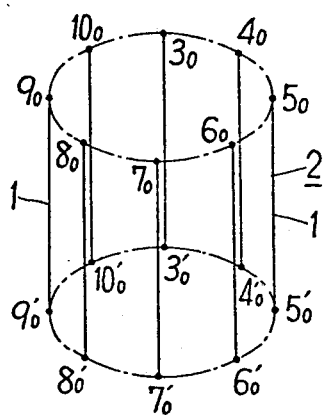
Figure 8D:
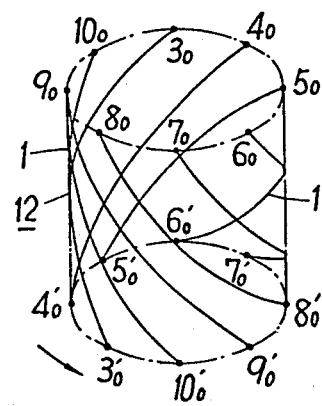

A straight cylindrical outer coil 2 (shown in FIG. 8(c)) has one ends of the wires 1 indicated as $3_o$ to $10_o$ and the other ends of the wires as $3_o$ to $10_o'$. As a second step, this outer coil is twisted at one end surface by $180(1-2/8)=135$ degrees in a direction reverse (counterclockwise) to that of the inner cylindrical coil 11 to define a spiral outer coil 12 which has the inner cylindrical coil 11 as a core member.

Figure 8E:
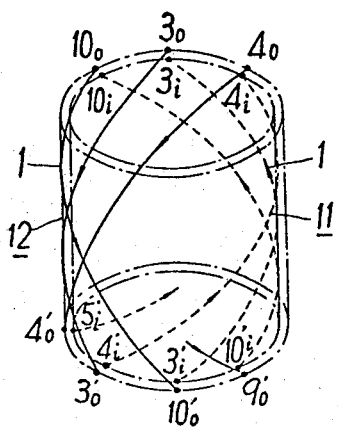

The respective surfaces of the wire ends $3_o'$ to $10_o'$ and $3i'$ to $10i'$ and of $3_o$ to $10_o$ and $3i$ to $10i$ are associated with each other so as to overlap in the radial directions of the cylinder as shown in FIG. 8(e). In the drawings, the inner cylindrical coil 11 is shown by dotted lines and the outer coil by phantom lines simply to make it easier to tell those coils apart.

The coil element wire 1 having started from $3i$ of the inner cylindrical coil 11 reaches $3i'$ of the other end of the coil element wire 1. End $3i'$ is connected to end $10_o'$ of the outer cylindrical coil 12. The latter end reaches from $10_o'$ to $10_o$, $10_o$ and is connected to $9i$, and such connections are sequentially made so as to eventually form one closed loop.

Figure 15A:
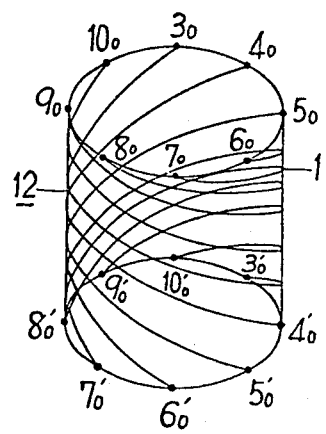
FIGS. 15(a) to 15(c) are explanatory views of manufacturing steps for making another embodiment of a coil unit of the present invention.
Figure 15B:
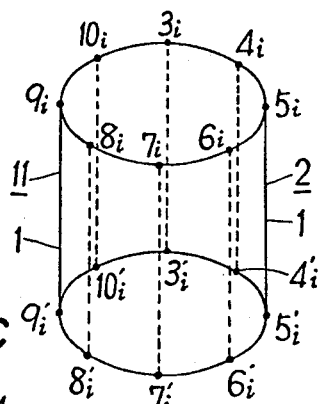
Figure 15C:
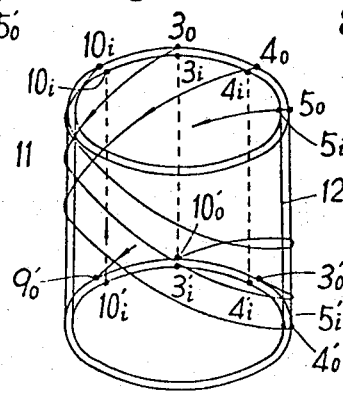

FIGS. 15(a) to 15(c) show another embodiment of the inner and outer cylindrical coils 11 and 12.

FIGS. 15(a) to (c) are explanatory views of manufacturing steps showing said another embodiment in respect of the form of the coil unit of the present invention, and FIG. 16 is a perspective view of the coil unit formed by the foregoing.

Figure 1:
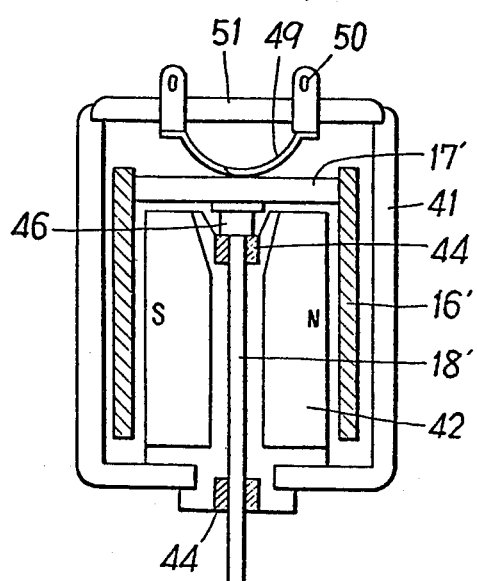
FIG. 1 is a sectioned view showing a motor in which the coil unit to which the present invention relates is used.
Figure 2:
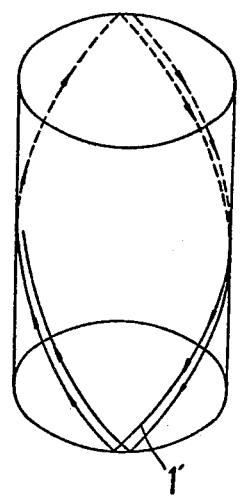
FIG. 2 is an explanatory view of a winding method in an example of a conventional coil unit of coreless armature.
Figure 3:
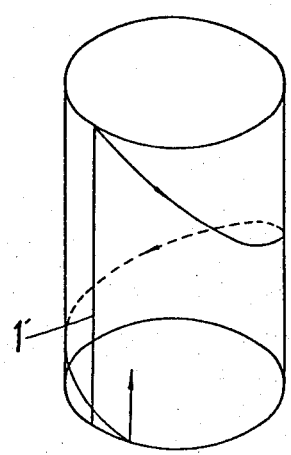
FIG. 3 is an explanatory view of a winding method in another example of the same as in the above.
Figure 4:
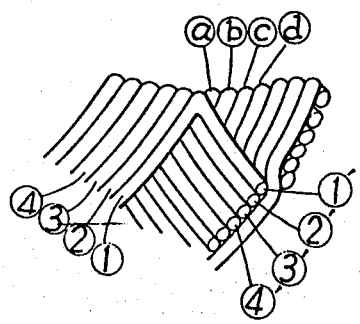
FIG. 4 is a perspective view of an essential part of a conventional coil unit of coreless armatures.
Figure 5:
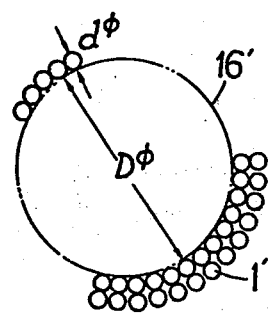
FIG. 5 is a plan view schematically showing a conventional coil unit of coreless armatures.
Figure 6:
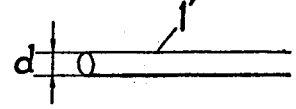
FIG. 6 is a perspective view of a conventional coil element wire.
Figure 7A:
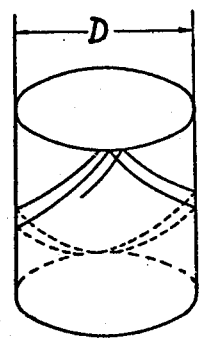
FIGS. 7(a) to 7(c) are views of winding formations of the coil element wire.
Figure 7B:
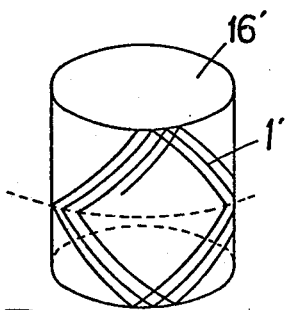
Figure 7C:
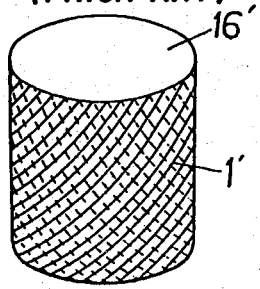

An outer cylindrical coil 12 of FIG. 15(a) is twisted by $360(1-\frac{1}{8})=315$ degrees counterclockwise and is combined as in FIG. 15(c) with an inner cylindrical coil 11 of a twisting angle of 0 degree formed of such straight cylindrical coil 12 as in FIG. 15(b). Overlapped parts of the wires are sequentially joined in the same manner as in FIG. 4 to form an electrically closed loops comprised of the outer cylindrical coil 12 and inner cylindrical coil 11. Such A coil unit 16 as in FIG. 16 is thus obtained. This can be simply formed because the inner cylindrical coil 11 is not twisted.

In order that the coil element wire 1 may form the sequentially closed loops, further, the following conditions must be satisfied.

That is, it is necessary that the coil element wires 1 forming the inner cylindrical coil 11 and outer cylindrical coil 12 are respectively of the same number and are parallely arranged on their respective cylindrical surfaces without overlapping each other. Also, when the outer cylindrical coil 12 is combined with the inner cylindrical coil 11, the respective coil element wires 1 of the outer cylindrical coil 12 should overlap in the radial directions on the respective coil element wires 1 of the inner cylindrical coil 11 at the respective ends.

When, in FIGS. 8(a) to 8(c), the coil element wires 1 are twisted in directions reverse to each other to form the inner and outer cylindrical coils 11 and 12 and they are combined and fitted with each other, the coil element wires 2 of the outer cylindrical coil 12 should not be arranged so as to be point-symmetrical with the coil element wires 1 of the inner cylindrical coil but rather should be fitted so that the coil element wires 1 will be offset by an amount of one wire at one end. For example, the coil element wires 1 are twisted by 180 degrees to form the inner cylindrical coil 11 and by $180(1\pm2/n)$ degrees to form the outer cylindrical coil 12.

The third step shall be explained next with reference to FIGS. 9 to 14.

Figure 9:
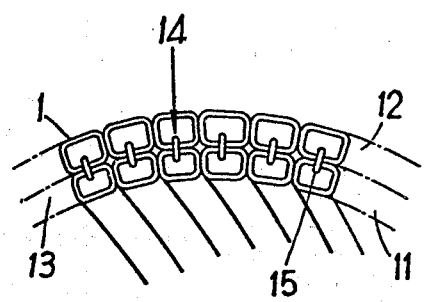
FIG. 9 is a magnified fragmentary perspective view of a joint part of the coil unit.
Figure 10:
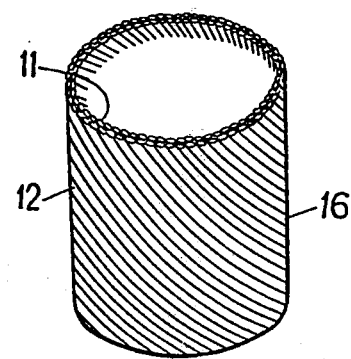
FIG. 10 is a perspective view of the thus-formed coil unit.
Figure 11:
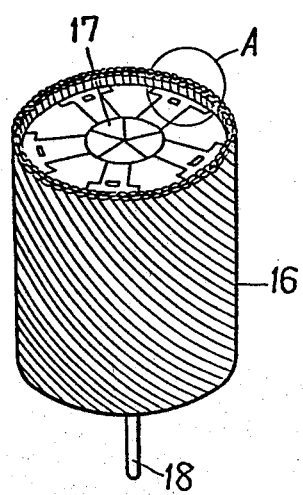
FIG. 11 is a perspective view of an embodiment of a coreless armature employing such coil.

FIG. 9 is an enlarged fragmentary perspective view of joint parts of the coil unit; FIG. 10 is a perspective view of the coil unit; FIG. 11 is a perspective view of a coreless type armature; and FIG. 12 is a perspective view of the circled part A in FIG. 11.

That is, as the third step, the overlapping parts 13 of the respective coil element wires 1 in the inner and outer cylindrical coils 11 and 12 are joined sequentially by means irradiations of a laser beam 14 indicated by the arrow as in FIG. 9 to form electrically closed loops comprised of the outer cylindrical coil 12 and inner cylindrical coil 11.

Figure 12A:
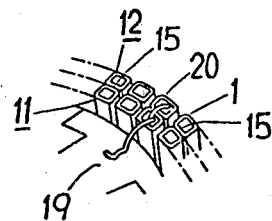
FIG. 12(a) is a magnified perspective view of the circled part A in FIG. 11 showing one manner of joining the wires.
Figure 12B:
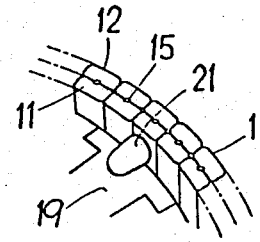
FIG. 12(b) is a view similar to FIG. 12(a) showing another manner of joining the wires.

In joining them by using the laser beam, when a pulse laser of a pulse width of several m Sec is adopted for the laser beam 14, the insulating film of the coil element wires which are adjacent to each other in the radial direction is evaporated and removed without damaging the insulating film of the wires 1 adjacent in the circumferential direction. At the same time, the overlapping parts 13 on the end edge surface are welded to form a welding nugget 15. The inner and outer cylindrical coils 11 and 12 are thus electrically interconnected to form a coil unit 16 as shown in FIG. 10. In order to prevent any short-circuiting from ocurring between the coil element wires 1 adjacent to each other in the circumferential directions due to fins produced in the periphery of cut end surfaces of the coil element wires 1, in this case, it will be further effective to remove the fins electrochemically or chemically. As shown in FIG. 11, commutators 17 and shaft 18 are secured to this coil unit 16 and a coreless type armature is obtained. FIG. 12(a) is a magnified perspective view of the circled part A in FIG. 11, wherein the coil element wire 1 is connected to a commutator segment 19 through a jumper wire 20 FIG. 12(b) is a view of the coil element wires 1 connected by a soldering 20, either of which method may be employed.

Whichever method may be employed, the coil element wire 1 is not insulatively coated on the end edge surface of the material of the coil unit and, therefore, can be easily connected.

Figure 13:
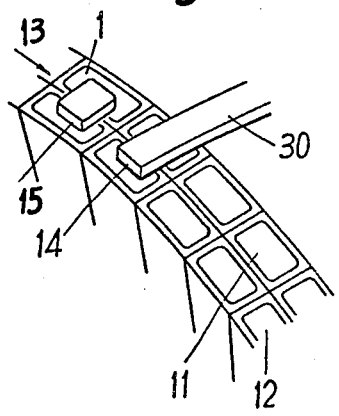
FIGS. 13 and 14 are magnified perspective views of the part A in FIG. 11 showing the steps involved in joining the wires.
Figure 14:
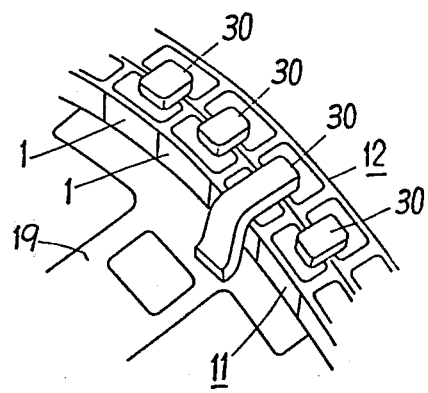

Further, as shown in FIGS. 13 and 14, in order to positively weld and join the overlapping parts of the coil element wires 1 of the inner and outer cylindrical coil 12 and inner cylindrical coil 11, connecting member 30 of copper, aluminum or the like is bridged as an auxiliary connecting member on the end edge surfaces of the inner and outer coil element wires 1.

Such connecting members 30 are fed sequentially out of, for example, a hoop member so as to overlap on the end edge surfaces of the coil element wires 1.

The connecting member 30 as overlapped is welded to the inner and outer coil element wires 1. The rest of the welded connecting member 30 is removed by means of the laser beam or mechanical cutting.

The welding by means of the connecting member 30 can be made without producing a large nugget between the inner and outer connecting members 30.

Further, such connecting member 30 may be made somewhat longer at the inner end so as to be welded to the commutator segment with the laser beam, as shown in FIG. 14.

Thus the coil unit 16 as in FIG. 10 can be formed.

In this coil unit 16, too, as in FIG. 12, the commutators 17 and shaft 18 are secured to obtain a coreless armature.

The foregoings shall be explained next with reference to practical methods of the present invention.

FIG. 17(a) and (b) are perspective views showing a practical method of forming the coil units, and FIGS. 18(a) and (b) are perspective views showing another practical method of forming the coil units.

FIG. 17 shows a practical manner in which the inner and outer cylindrical coils 11 and 12 are wound.

The coil element wire 1 to be used is of a self-fusing type made by insulatively coating a wire material of copper or aluminum with such synthetic resin as a polyester imide resin, ester imide resin or the like and providing such fusing layer as of a nylon series synthetic resin, epoxy series synthetic resin or the like on the surface.

For the wire material of the coil element wire 1, a wire material made flat or rectangular in section by means of a drawing operation or the like is recommended, because side surfaces of the coil element wires come into close contact with each other in the winding so as to be effective to elevate the current density and so on. FIG. 9 in the foregoing explanation shows this state.

As shown in FIG 17(a), first, the coil element wires 1 of a quantity "n" are pulled out of coil bobbins 23 arranged satellitically with respect to a core metal 22. The wire are wound on the core metal 22 by rotating the coil bobbins 23 around the core metal 22 while moving them in the axial direction of the core metal so as to be twisted by 180 degrees to obtain an inner cylindrical coil 11. In such case, the core metal 22 may be rotated instead of the satellitic rotation of the coil bobbins 23. Then, as shown in FIG. 17(b), "n" coil bobbins 24 are moved in the axial direction of the core metal 22 while being rotated in the reverse direction in the same manner as in the foregoing wire winding method on the inner cylindrical coil 11 wound on the core metal 22. Then the outer cylindrical coil 12 is wound with the coil element wires 1 twisted by 180 (1±2/n) degrees on the inner cylindrical coil 11. It is of course possible to rotate the core metal 22 instead of the satellitic rotation of the coil bobbins 24, the same as in the foregoing. The inner and outer cylindrical coils are cut into pieces for each length (L as shown in the drawing) corresponding to the twisting angle of 180 (1±2/n) degrees and are connected mutually at their ends to obtain the coil units 16.

There is shown in FIGS. 18(a), 18(b) still another practical winding method. First, as shown in FIG. 18(a), a strip-shaped tape consisting of "n" coil element wires 1 arranged in parallel is wound on a core metal 25 in a manner similar to a so-called mulit-threaded screw and many cylindrical coils 11 continuously joined are obtained.

The strip-shaped tape is formed by flattening wires by a press. The coil element wires 1 are made by coating a wire material of copper or aluminum with such synthetic resin as a polyester imide resin, ester imide resin or the like and providing a fusing layer of a nylon series synthetic resin, epoxy series synthetic resin or the like on their surface and then fusing and joining them through a fusing layer so as to be in the form of a tape in which the "n" coil element wires 1 are arranged in parallel.

The strip-shaped tape is (i) tightly fixed at one end with a pressing plate 31 screwed to a fixing plate 33 provided to project at one end of the core metal 25, (ii) sequentially wound up by being twisted by 180 degrees in the direction of the core metal 25 with the pressing plate 31 as a base end and (iii) fixed similarly at the terminating end to the core metal 25 with a ring-shaped band 32.

In winding up the strip-shaped tape, the winding is made by having side edge parts of the strip-shaped tape somewhat overlapped on each other to bring them into close contact with one another so that no gap will be provided between them. A solvent such as acetone, alcohol or the like is applied to their abutting parts. Heating is performed as required so that the strip-shaped tape will be fused to be integral through the insulating film. In such case, the strip-shaped tape may be rotated with respect to the core metal 25 or the core metal 25 may be rotated. Then, as shown in FIG. 8(b), another strip-shaped tape consisting of "n" coil element wires 1 similarly arranged in parallel is wound on the previously wound inner cylindrical coils 11 as twisted by 180 (1±2/n) degrees in the form of the so-called mulit-threaded screw in the direction reverse to that of the inner cylindrical coils 11 to obtain many outer cylindrical coils 12 continuously joined. in such case, too, the strip-shaped tape of coil element wires may be rotated with respect to the core metal 25 or the core metal 25 may be rotated.

The strip-shaped tape forming many cylindrical coils 12 is tightly wound and fixed at one end with a pressing plate 34 screwed onto the other side of the above referred fixing plate 31 and is wound sequentially in the direction of the core metal 25 with the pressing plate 34 as a base end. In this case, the outer cylindrical coils 12 are fitted to the base end part so that each of the coil element wires 1 of the outer cylindrical coil 12 will correspond to each of the coil element wires 1 of the inner cylindrical coils 11 in the radial direction.

The outer cylindrical coils 12 are wound up in the same manner as in the above described inner cylindrical coils 11. In winding up the outer cylindrical coil 12, a solvent such as acetone, alcohol or the like is applied between the outer cylindrical coils 12 and the inner cylindrical coils 11 and they are heated as required so as to be fused to be integral with each other. They are cut into pieces for each length (L as shown in the drawing) corresponding to the twisting angle of 180 (1±2/n) degrees to obtain materials of the coil units 16.

In cutting them, it is generally convenient to mechanically cut them with a wire saw or cutting them while blowing a free hone grains near them and slightly vibrating a steel wire. If a slit 33 is provided, removing the insulating coating at each length L shown, the combination of the inner and outer cylinders 11 and 12 can be cut into pieces of a predetermined size by means of an etching in an etching solution. If this method is adopted, the materials of the coil units 16 will not be mechanically deformed.

Figure 19:
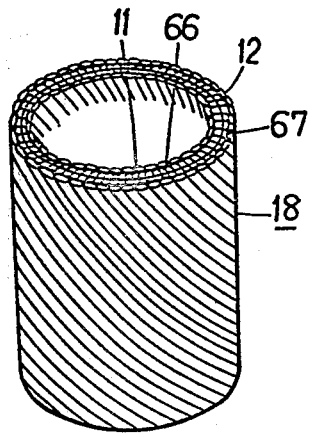
Figure 20:
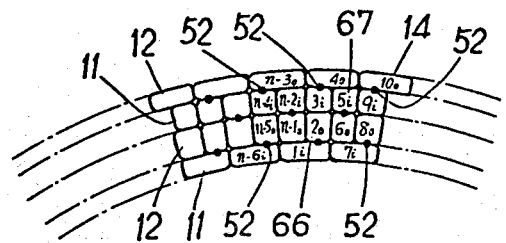

An example of a coil unit 18 obtained by combining the coil units 16 obtained as described above shall be explained next. FIGS. 19 and 20 show the same, wherein FIG. 19 is a perspective view, and FIG. 20 is a schematic plan view.

While, as has been described above, the coil unit 16 consisting of a pair of the inner and outer cylindrical coils 11 and 12 is formed, another coil unit 16 fitting inside or outside the thus formed coil unit 16 is combined with the latter. Their overlapping parts 52 are sequentially joined by the laser welding or the like from the innermost cylindrical coil 11 to the outermost cylindrical coil 12 to form electrically closed loops of all the cylindrical coils. Such a coil unit 18 has an intermediate inner cylindrical coil 66 and an intermediate outer cylindrical coil 67 as shown in FIG. 19. As seen on one end edge surface, the overlapping parts 52 are not all joined but are joined at every other of them as shown in FIG. 20 to form a coil unit as a whole. In FIG. 20, each dot mark . denotes a joining point, and suffix "i" denotes an inner cylindrical coil, in which the coil element wires 1 are twisted clockwise. The suffix "o" denotes an outer cylindrical coil in which the coil element wires 1 are twisted counterclockwise. Further, the numerals assigned to the end edge surfaces of the respective coil element wires 1 denote the joining order of the coil element wires 1.

The effects of the present invention are as follows:

(1) As the method of simultaneously winding a plurality of coil element wires instead of the conventional manufacturing method employing the winding machine wherein a single coil element wire is wound from the first to the last to form a single coil, the manufacturing time is reduced.

(2) As the inner cylindrical coil is formed of a one-layer winding of coil element wires of an equal length arranged in parallel and an outer cylindrical coil is formed of coil element wires of an equal length arranged in parallel, the length per turn of the coil unit made by overlapping them is uniform.

(3) As the coil unit made by overlapping such inner cylindrical coil of a one-layer winding and outer cylindrical coil on each other is constant in the thickness in the radial direction, the precision of the inner and outer diameters of a rotor formed of them is high, the air gap between the yoke and the magnet in which the rotor is inserted can be made smaller, which is contributive to a minimization in size of the motor.

(4) Further in the coil unit of the present invention, as the coil element wires are used without being bent back, the coil unit can be formed of the coil element wires of a rectangular or flat cross-section. As the coil element wires of such rectangular or the like cross-section can be used, the cross-section of the coil element wires may be made flat in the radial direction or peripheral direction of the coil, whereby the number of turns of the coil element wires may be made variable even with the coil element wires of the same cross-sectional area used, so that motors of different characteristics can be well designed.

Further, for example, by making the cross-section of the coil element wire flat in the radial direction, a coil of a single-layered winding equal to a coil of a multi-layered winding can be obtained and, by making the cross-section of the coil element wire flat in the peripheral direction of the coil, a coil of a smaller thickness can be formed.

BEST MODE FOR WORKING THE INVENTION

First, as shown in FIG. 18(a), a strip-shaped tape consisting of "n" coil element wires 1 arranged in parallel is wound on a core metal 25 in a manner similar to so-called multi-threaded screw to obtain many inner cylindrical coils 11 continuously joined with the coil element wires 1 twisted by 180 degrees. Then, as shown in FIG. 18(b), a strip-shaped tape consisting of "n" coil element wires 1 also arranged in parallel is wound on the inner cylindrical coil 11 wound on the core metal 25 in the form of the so-called multi-threaded screw in the direction reverse to that of the inner cylindrical coils 11 obtain many outer cylindrical coils continuously joined with the coil element wires 1 twisted by 180 (1±2/n). Then, they are cut into pieces at every length (L as shown in the drawing) corresponding to the twisting angle of 180 (1±2/n) degrees to obtain materials of coil units 16.

Next, as the third step, overlapping parts 13 of the respective coil element wires 1 of the outer cylindrical coil 12 and inner cylindrical coil 11 are joined sequentially by irradiations of laser beam 14 shown by the arrow in FIG. 10 to obtain a coil unit 16 forming an electrically closed loop of the outer cylindrical coil 12 and inner cylindrical coil 11.

As in FIG. 11, a commutator 17 and shaft 18 are secured to this coil unit 16 and a coreless armature is obtained.

I claim:

1. A coil unit of a coreless armature for use with means creating a magnetic field, said coil unit comprising at least a pair of inner and outer coil wire layers, said layers being formed by mutually separate inner and outer cylindrical coil elements, respectively, each said element comprising a plurality of coil wire sections of a conductor having an insulation coating and mutually parallely arranged along the periphery of cylindrical shape of said cylindrical element while running from one of both axial end edges of said cylindrical shape to the other relatively in intersecting relationship to said wire sections in the other element, said separate inner and outer coil elements being assembled closely coaxially so as to opposite, in radial direction of the cylindrical shape, each end of said wire sections in one of the elements to each end of the wire sections in the other element at each of said axial ends, said wire sections of each of said elements being twisted into a helical orientation, with the twisting of the wire sections of said element being performed in a direction opposite that of the other element to establish said intersecting relationship, and means for electrically connecting between said radially opposed ends of the wire sections of the respective elements for forming an electrically closed loop of coil in which the wire sections intersecting diagonally the magnetic field, said electric connecting means comprising a fused nugget of said conductor of said wire sections exposed at said axial end edges.

2. A coil unit according to claim 1, which comprises at least a further pair of said inner and outer coil wire layers of said coil elements and disposed closely coaxially with said first named pair of layers, said electric connecting means connecting sequentially said opposed ends of said wire sections from the innermost element to the outermost element at every other of the opposed ends.

* * * * *